Sept. 25, 1934.   E. R. HANSON   1,974,918
CONDENSER CONSTRUCTION
Filed July 24, 1931
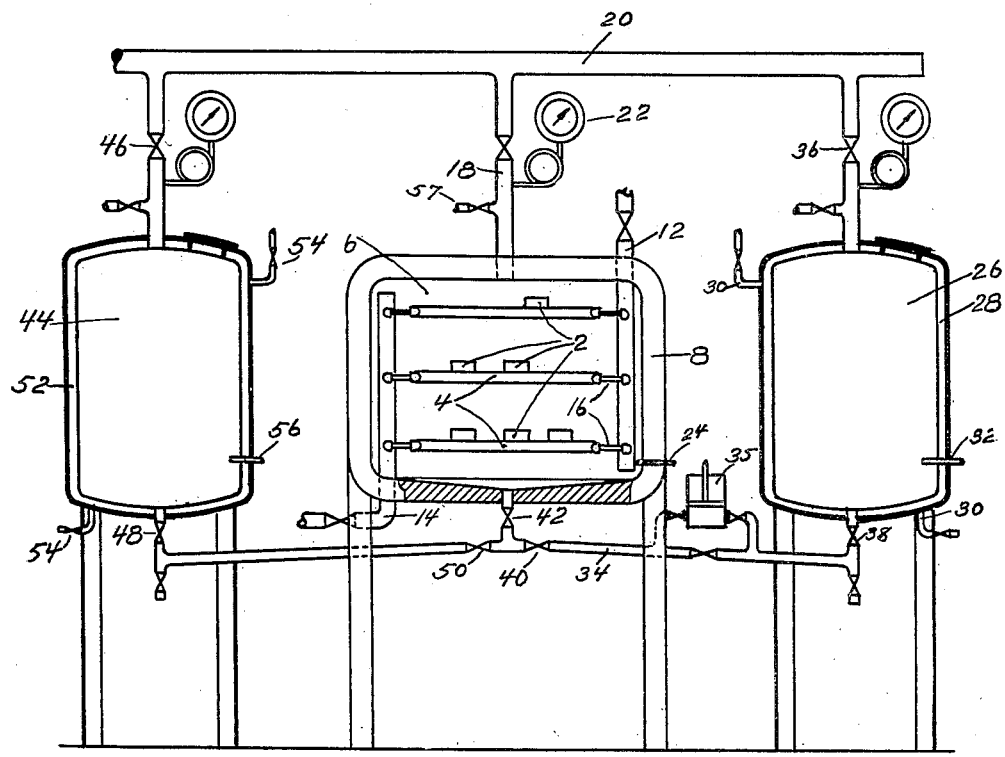
INVENTOR.
Ernest R. Hanson
BY
Jos. N. Nielsen
ATTORNEYS.

Patented Sept. 25, 1934

1,974,918

UNITED STATES PATENT OFFICE 1,974,918

CONDENSER CONSTRUCTION

Ernest R. Hanson, Bloomfield, N. J., assignor to Halowax Corporation, New York, N. Y., a corporation of Delaware Application July 24, 1931, Serial No. 552,854

18 Claims. (Cl. 175—41)

This invention relates to an electrical condenser, to the method of impregnating the condenser with a dielectric and to the dielectric materials.

Paper foil condensers have heretofore been impregnated by heating them under a vacuum to withdraw moisture and air, immersing them in melted chlorinated naphthalene, then removing them from the impregnating tank and cooling in a bath of mineral oil. There are numerous defects in this method and the condenser produced thereby, which it is the object of the present invention to correct.

According to the present invention, the condensers are subjected to vacuum to withdraw air and moisture, in the usual way. Then, without breaking the vacuum, a liquid dielectric which later solidifies and remains a solid under the normal working conditions of the condenser, is admitted to the vacuum chamber to surround and impregnate the condensers. The conditions of impregnation are then changed so that the dielectric approaches its solid condition, but before it solidifies it is withdrawn from the impregnating chamber and, while still maintaining the vacuum, a second liquid dielectric is admitted to the vacuum chamber. The impregnating conditions are then adjusted to cause the solidification of the first dielectric within the condenser and thereafter, for the first time, the condensers are subjected to normal atmospheric conditions and removed from the impregnating chamber. As the entire treatment of the condensers takes place under a continuous vacuum, no opportunity is afforded for air or moisture to enter the condenser body between the two impregnations and consequently a better and more lasting condenser is produced.

The characteristics of the two dielectrics are also important. The first dielectric is a material, such as naphthalene containing halogens equivalent to three, four, five or six hydrogen atoms, which is a solid at room temperature and has excellent delectric properties. The second dielectric should have the following properties; it should remain liquid under the condition at which the first dielectric solidifies within the body of the condenser during impregnation, it should be a good dielectric itself, if it dissolves any of the first dielectric it should be easily separable therefrom upon proper treatment so that the two materials can be recovered, and it should be such that while the two dielectrics are in contact, as they are in the condenser body and also during their recovery, neither dielectric will break down to produce other materials such as carbon, water, halogen acids, etc., which will contaminate them or impair their dielectric qualities and cause a break down of the condenser, or render the dielectrics unfit for further use in impregnating condensers.

These and other objects and features of the invention will more fully appear from the following claims taken in conjunction with the accompanying drawing, which however, must be considered as merely illustrating the invention and in no way limiting it to the embodiment shown and described.

The single figure of the drawing is a somewhat diagrammatic and elemental representation of an impregnating apparatus which may be used in carrying out the new process and producing the condensers.

As illustrated herein, the assembled condenser bodies 2, are placed upon hollow heat conducting shelves 4, within an impregnation chamber 6, the walls 8, of which are preferably lagged to prevent the transfer of heat. A front or door (not shown) is fastened in place on the front of the chamber. Valved pipes 12 and 14, permit a heating or cooling medium such as steam, hot water or cold water to pass into the interior of the shelves through the connections 16. When the chamber is closed, the condensers are heated and subjected to vacuum by passing steam through the shelves and opening a vacuum connection 18, to a vacuum line 20. The degree of vacuum may be determined by a vacuum gauge 22, and the temperature may be determined by any suitable type of heat recording device 24.

After the condensers have been thoroughly heated and all of the air has been withdrawn from the condenser bodies and from the chamber, the first dielectric is admitted to the vacuum chamber. This dielectric is preferably a halogenated carbocyclic compound which is normally a solid waxy material but which is readily liquefied by heat, such as tri-, tetra-, penta-, or hexachlornaphthalene. This material may be stored in the tank 26, where it can be heated or cooled as desired by admitting a heating or cooling medium into the jacket 28 from valved pipes 30, the temperature being recorded by any suitable instrument 32. Before the dielectric is run into the impregnation chamber, it is preferably heated under a vacuum for a sufficient period to remove all traces of air and moisture from it. The liquid dielectric is run into the impregnation chamber through the pipe 34, by a pump 35 or by closing the vacuum valve 36, and opening the valves 38, 40, and 42, thus slightly unbalancing the vacuum. The dielectric is permitted to remain in the impregnation chamber at a rather high temperature to keep it thoroughly fluid, until the condensers are sufficiently impregnated. Then a cooling medium is passed through the hollow shelves 4, to cool the dielectric to such a point that it is slightly above, for instance 10° above, its solidification temperature. This cooling contracts the dielectric as much as possible while the mass of material is still fluid enough to fill the spaces left by the contraction and also fluid enough to be withdrawn easily from the impregnation chamber. When the full vacuum is on the chamber and the condensers are thoroughly impregnated, the still fluid dielectric is withdrawn into the tank 26, by closing the vacuum valve 18, and opening the valve 36, or by the pump while both vacuum valves remain open.

As soon as the dielectric has been removed from the impregnation chamber as completely as possible, the valve 40, is closed and the second dielectric is admitted from the tank 44, by closing the vacuum valve 46, and opening the valves 48 and 50. The second dielectric is preferably maintained at a relatively low temperature by a cooling medium which flows through the jacket 52, by the valved pipes 54, its temperature being recorded by the thermometer 56. The cold liquid chills the condenser units thus setting the first dielectric, particularly where the dielectrics contact. This is very desirable because it in large measure prevents the first dielectric from dissolving in the second. The cooling of the condensers is then continued until they are at room temperature after which the valve 18 is closed and valve 57 is opened to permit air to enter the impregnation chamber to force the second dielectric into any voids in the condenser body not previously filled. By opening the vacuum valve 46, and the valves from the impregnation chamber to the tank 44, the dielectric is withdrawn from the impregnation chamber and, as the dielectric recedes, the condensers are uncovered being, for the first time, exposed to the air, which is allowable as they are completely impregnated. Valves 48, and 50 are then closed to prevent air entering the tank 44, after which the vacuum chamber is opened and the condensers are removed for coating, potting, etc.

As previously stated the first dielectric is preferably a normally solid halogenated carbocyclic compound, chlorinated naphthalene being usually used because it is readily obtainable in the market. The second dielectric is also a carbocyclic compound, which is a liquid or semi-liquid at room temperatures, such as monochlornaphthalene or or liquid halogenated diphenyl, halogenated phenyl ether, halogenated phenanthrene or their halogenated liquid hydroxy derivatives. Of these substances the liquid halogenated diphenyl, halogenated phenyl ether, or halogenated phenanthrene and their hydroxy derivatives are preferred because the halogenated solids are only slightly soluble in them, whereas the solids are more soluble in the monochlornaphthalene. These liquids are, of themselves, excellent dielectrics and therefore when they fill the spaces which form at the ends of the condenser when the hot dielectric contracts upon cooling, the condenser is impregnated at all places with an efficient dielectric. Furthermore these halogenated liquids do not react with the halogenated solids (as do mineral oils or aliphatic hydrocarbons with long carbon chains) to crack or otherwise break up either of the dielectrics.

Thus no foreign materials such as carbon, water, halogen acids, etc., are formed during continued use of the condenser and particularly if it should become overheated. These foreign materials cause very rapid deterioration of the dielectric and therefore greatly shorten the life of the condenser.

The normally solid halogenated aromatic hydrocarbons are only slightly soluble in these halogenated liquids at normal temperatures. They are also soluble in the usually used mineral oils. It is therefore inevitable that when the condensers are immersed in either the usual oils or these halogenated liquids, some of the halogenated solids are dissolved and, as they are relatively costly, it is desirable that they be recovered. The halogenated solids cannot be recovered from the usual mineral oils, however, without producing the above mentioned foreign substances because when the mixture is heated, the mineral oils and the halogenated solids appear to react with each other to produce the foreign substances. It has been discovered, however, that the halogenated solids can readily be recovered from the halogenated liquids by distillation and even through the distillation temperature be relatively high, no deleterious materials are formed. This is a pronounced improvement because both dielectrics can rather easily be recovered from their mixture and can be obtained in substantially their original purity for further use.

From the above description of the method, apparatus, and materials which are used, it will be obvious that numerous changes and modifications of details may be made and it is therefore desired that the invention be construed as broadly as the claims, taken in conjunction with the prior art, may allow.

I claim:

1. In a method of making a condenser having conducting elements and insulating elements, the steps of placing the elements in their proper positions to form a condenser body, subjecting the condenser body to a vacuum to draw air from it, impregnating the body while under the vacuum with a primary insulating material, withdrawing the excess insulating material while maintaining the vacuum, and impregnating the body with a second insulating material having characteristics different from the first insulating material while maintaining the body under a vacuum.

2. In a method of making a condenser having conducting elements and insulating elements, the steps of placing the elements in their proper positions to form a condenser body, subjecting the condenser body to a vacuum, impregnating the body while under the vacuum with a liquid insulating material, withdrawing the excess insulating material while maintaining the body under a vacuum, surrounding the body with a second liquid insulating material without breaking the vacuum, solidifying the first insulating material while the body is surrounded by the second insulating material and while maintaining the body under the vacuum, and withdrawing the excess of the second insulating material.

3. In a method of making a condenser having conducting elements and insulating elements, the steps of placing the elements in their proper positions to form a condenser body, subjecting the condenser body to a vacuum, impregnating the body while under vacuum with a liquid insulating material which becomes solid after the impregnation, withdrawing the excess insulating material while maintaining the body under a vacuum, surrounding the body with a second insulating material without breaking the vacuum, and withdrawing the excess of the second insulating material.

4. In a method of making a condenser having conducting elements and insulating elements, the steps of placing the elements in their proper positions to form a condenser body, subjecting the condenser body to a vacuum, impregnating the body while under the vacuum with a liquid insulating material which is normally solid under the working conditions of the condenser, withdrawing the excess insulating material while maintaining the body under a vacuum, and filling the remaining openings in the body without breaking the vacuum with a second insulating material which is liquid under the conditions at which the first insulating material is a solid.

5. In a method of making a condenser having conducting elements and insulating elements, the steps of placing the elements in their proper positions to form a condenser body, subjecting the condenser body to a vacuum, impregnating the body while under the vacuum with a freely fluid melted insulating wax which is normally solid at the working temperature of the condenser, withdrawing the excess wax while maintaining the body under a vacuum, surrounding the body without breaking the vacuum with a liquid insulating material which remains liquid below the temperature at which the wax solidifies, and cooling the body to solidify the wax while maintaining the body under a vacuum and surrounded by the second insulating material.

6. In a method of making a condenser having conducting elements and insulating elements, the steps of placing the elements in their proper positions to form a condenser body, subjecting the condenser body to heat and vacuum to draw air and moisture from it, impregnating the body while under the vacuum with a freely fluid melted insulating wax which is normally solid at the working temperature of the condenser, cooling the body to a temperature slightly above the solidification temperature of the wax, withdrawing the excess wax while maintaining the body under a vacuum, surrounding the body without breaking the vacuum with a liquid insulating material which remains liquid below the temperature at which the wax solidifies, and cooling the body to solidify the wax while maintaining the body under a vacuum and surrounded by the second insulating material.

7. In a method of making a condenser having conducting elements and insulating elements, the steps of placing the elements in their proper positions to form a condenser body, subjecting the condenser body to heat and vacuum to draw air and moisture from it, impregnating the body while under the vacuum with a freely fluid hot insulating wax which is normally solid at the working temperature of the condenser, cooling the body to a temperature slightly above solidification temperature of the wax to contract the wax within the body but keep it fluid, withdrawing the excess wax while maintaining the body under a vacuum, surrounding the body without breaking the vacuum with a cold liquid insulating material which remains liquid below the temperature at which the wax solidifies, and cooling the body to solidify the wax while maintaining the body under a vacuum and surrounded by the second insulating material.

8. In a method of making a condenser having conducting elements and insulating elements, the steps of placing the elements in their proper positions to form a condenser body, impregnating the body with a halogenated hydrocarbon cyclic compound which is a liquid during the impregnation and thereafter solidifies, withdrawing the body from the compound after impregnation, surrounding the body with a second halogenated hydrocarbon cyclic compound which remains liquid under the conditions at which the first compound solidifies, and solidifying the first compound.

9. In a method of making a condenser having conducting elements and insulating elements, the steps of placing the elements in their proper positions to form a condenser body, impregnating the body with a heated liquefied halogenated hydrocarbon cyclic compound which solidifies upon cooling, withdrawing the body from the compound after impregnation, surrounding the body with a second halogenated hydrocarbon cyclic compound which remains liquid at the temperature at which the first compound solidifies, and cooling the first compound to solidify it.

10. In a method of making a condenser having conducting elements and insulating elements, the steps of placing the elements in their proper positions to form a condenser body, impregnating the body with a hot liquefied halogenated cyclic hydrocarbon wax which solidifies upon cooling, cooling the body to a temperature slightly above the solidification temperature of the wax, withdrawing the body from the wax after impregnation, surrounding the body with a halogenated hydrocarbon cyclic liquid which remains liquid at the temperature at which the first compound solidifies, and cooling the first compound to solidify it.

11. In a method of making a condenser having conducting elements and insulating elements, the steps of placing the elements in their proper positions to form a condenser body, impregnating the body with a liquid chlorinated naphthalene which is normally a solid under the working conditions of the condenser, withdrawing the body from said naphthalene after impregnation, surrounding the body with a chlorinated hydrocarbon cyclic compound which remains liquid under the conditions at which said naphthalene solidifies, and solidifying said naphthalene.

12. A condenser having a body containing conducting elements and insulating elements, a solid halogenated hydrocarbon cyclic compound impregnating said body to insulate said elements, and a liquid halogenated hydrocarbon cyclic compound filling any voids in the body not filled by the solid compound.

13. A condenser having a body containing conducting elements and insulating elements, a halogenated cyclic hydrocarbon wax impregnating said body to insulate said elements, and a liquid halogenated hydrocarbon cyclic compound filling any voids in the body not filled by the wax.

14. A condenser having a body containing conducting elements and insulating elements, a solid chlorinated hydrocarbon cyclic compound impregnating said body to insulate said elements, and a liquid chlorinated hydrocarbon cyclic compound filling any voids in the body not filled by the solid compound.

15. A condenser having a body containing conducting elements and insulating elements, a halogenated cyclic hydrocarbon wax impregnating said body to insulate said elements, and a halogenated hydrocarbon cyclic compound which is more fluid than the wax filling the voids in the body not filled by the wax.

16. A condenser having a body containing conducting elements and insulating elements, a halogenated cyclic hydrocarbon wax impregnating said body to insulate said elements, and a halogenated hydrocarbon cyclic compound which is more fluid than the wax filling the voids in the body not filled by the wax, said compound containing at least one of the group comprising halogenated diphenyl, halogenated phenyl ether, halogenated phenanthrene, halogenated naphthalene, and halogenated hydroxy derivatives thereof.

17. A condenser having a body containing conducting elements and insulating elements, a halogenated cyclic hydrocarbon wax impregnating said body to insulate said elements, and a halogenated hydrocarbon cyclic compound which is more fluid than the wax filling the voids in the body not filled by the wax, said compound containing at least one of the group comprising chlorinated diphenyl, chlorinated phenyl ether, chlorinated phenanthrene, chlorinated naphthalene, and chlorinated hydroxy derivatives thereof.

18. A condenser having a body containing conducting elements and insulating elements, a solid halogenated hydrocarbon cyclic compound impregnating said body to insulate said elements, and a liquid halogenated hydrocarbon cyclic compound filling any voids in the body not filled by the solid compound, said compounds being characterized by substantial absence of any chemical reaction with respect to each other.

ERNEST R. HANSON.